Figure 1:
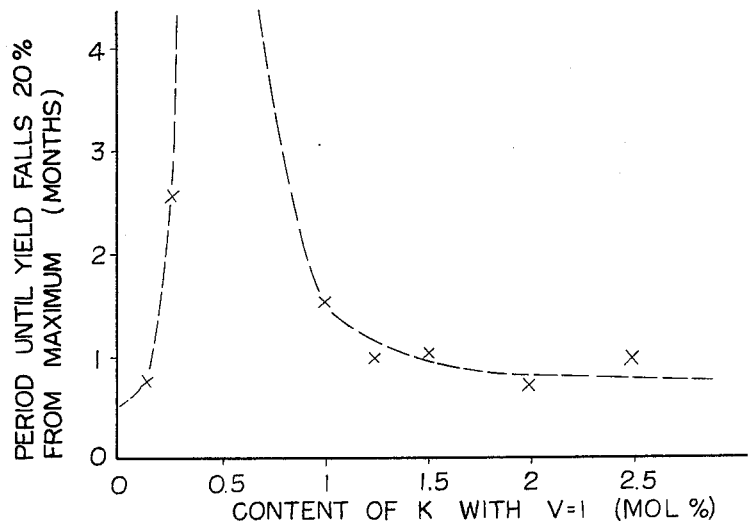

United States Patent Office 3,215,644
Patented Nov. 2, 1965

3,215,644
OXIDATION CATALYSTS OF ORTHOXYLENE AND NAPHTHALENE AND THE PREPARATION THEREOF
Hideo Kakinoki, Inaho Kamata, and Yasuo Aigami, Tokyo, Japan, assignors to Dainippon Ink Seizo Kabushiki Kaisha, Tokyo, Japan, a corporation of Japan
Filed Dec. 28, 1960, Ser. No. 78,918
Claims priority, application Japan, Dec. 29, 1959, 34/41,055; Dec. 20, 1960, 35/49,261
6 Claims. (Cl. 252—440)

This invention relates to novel oxidation catalysts of orthoxylene and naphthalene, and a method of preparation thereof. More particularly, the invention relates to the use as a catalyst $KHV_2O_6$ or composition principally of the same in preparing phthalic anhydride by oxidizing either orthoxylene, naphthalene or a mixture thereof.

A primary object of the present invention is to provide a catalyst that will make possible the obtaining of phthalic anhydride of high purity at high yields by oxidizing either orthoxylene, naphthalene or a mixture thereof.

Another object of the invention is to provide a catalyst of very long life when used in oxidizing orthoxylene, naphthalene and a mixture thereof.

Still another object of the invention is to provide an excellent carrier in connection with the above catalyst.

Accordingly, a further object of the invention is to provide an improved commercially feasible method of preparing phthalic anhydride of high purity at high yields by oxidizing orthoxylene, naphthalene and the mixture thereof.

Hitherto, it has been known for a long time that the vanadium pentoxide type catalyst was useful as an oxidation catalyst of organic compounds, and various compositions thereof have been proposed. To obtain satisfactory results, it was however generally required that a specific catalyst be selected and used depending upon the type of material to be oxidized or the oxidation mechanism.

For example, as the catalyst for obtaining phthalic anhydride by air oxidation of naphthalene there have been known those in which vanadium pentoxide has been added to such as pumice, aluminum sponge, carborundum silica gel, etc. That in which vanadium pentoxide has been caused to be absorbed in silica gel and referred to as the so-called German catalyst is known to be particularly excellent. It has been previously reported in a Publication Board Report by the Department of Commerce in Washington that a yield of 87% is possible when this catalyst is used.

However, even though this catalyst is used in the reaction for preparing phthalic anhydride by oxidizing orthoxylene or a mixture of orthoxylene and naphthalene, the yield is at most only less than 50%. In this case, unless an entirely different catalyst is used, good results are not obtainable.

We found that $KHV_2O_6$ or a composition containing the same as a principal component was used with very great advantage as a catalyst in preparing phthalic anhydride by oxidizing in a gaseous phase orthoxylene, naphthalene or a mixture thereof.

According to the invention, the $KHV_2O_6$ or the composition containing the same as a principal component is prepared generally by mixing a vanadium compound and a potassium compound in a ratio such that the molar ratio of vanadium to potassium (V:K) becomes 1:0.25–0.75 and reacting the two under acidic condition. In this connection, when the vanadium compound and the potassium compound are mixed such that the molar ratio of vanadium to potassium (V:K) becomes that in which the proportion of potassium is less than 1:0.25 or more than 1:0.75 and reacted under a condition similar as above, the proportion of those potassium-vanadium containing compounds other than $KHV_2O_6$ that are contained in the obtained catalyst composition becomes large. Consequently, it is undesirable in that either the yield of phthalic anhydride decreases, the life of the catalyst is shortened conspicuously or the coloration of phthalic anhydride obtained after a relatively short number of hours increases.

In preparing the $KHV_2O_6$ or a compound containing the same as its principal component, as the vanadium compound to be used as the starting material, any of the vanalium compounds such as vanadium pentoxide ($V_2O_5$), ammonium metavanadate ($NH_4VO_3$), etc. may be used. As regards the other starting material, the potassium compound, this also may be any of the potassium salts or potassium compounds such as potassium sulfate ($K_2SO_4$), potassium chloride (KCl), potassium carbonate ($K_2CO_3$), potassium nitrate ($KNO_3$), potassium acetate ($CH_3COOK$), potassium formate (H.COOK), etc. However, since the $KHV_2O_6$ that is used as the catalyst in the present invention is present only in an acidic and anhydrous state, it is necessary that the obtained $KHV_2O_6$ or the compound containing the same must be maintained under acidic conditions.

The $KHV_2O_6$ or a compound containing the same as its principal component can also be used in the gaseous phase oxidation reaction of orthoxylene, naphthalene or a mixture thereof by causing their adherence to any of the known carriers such as activated alumina, fused alumina, titanium oxide, pumice, aluminum sponge, silica gel, gypsum, etc.

Therefore, in preparing the $KHV_2O_6$ or a composition containing the same as its principal component, which are the catalysts of the present invention, the vanadium compound and the potassium compound are mixed together with a medium such as, for example, water such that the ratio V:K comes within the range of 1 to 0.25–0.75. Then this mixture is either coated to the surface of a carrier, a carrier impregnated with the mixture or the mixture and a carrier is mixed to a paste-like consistency. These are then dried under acidic conditions, preferably while feeding thereto an acidic gas, at above 40° C. before or after molding, and thereafter is burned at about 200–500° C. The catalyst may also be prepared by adding in excess to an acidic solution or suspension containing the aforementioned vanadium compound and potassium compound a reducing acid such as, for example, $SO_2$ gas or oxalic acid to make a vanadyl liquid, then coating or impregnating the carrier with the same followed by drying this at above 40° C. and molding, and thereafter burning at about 200–500° C.

According to researches by us we found that the anatase type titanium oxide was very excellent as a carrier of the $KHV_2O_6$ catalyst. The reasons therefor is that whereas if as the carrier a carrier other than an anatase type titanium oxide is used, either the coloration of the product becomes great, the yield of the phthalic acid decreases or the life of the catalyst is shortened. On the other hand, when the anatase type titanium oxide is used as the carrier, phthalic anhydride of high purity and hence of small coloration can be obtained with a maximum yield, and moreover its catalytic life is the longest. In addition, inasmuch as the anatase type titanium oxide are obtainable as particles having very uniform granulation, there is the advantage that the reaction can be carried out uniformly. As a result of our studies, we found that this anatase type titanium oxide was not limited in its use as a carrier for the $KHV_2O_6$ catalyst used in the present invention, but was also very excellent as a catalyst carrier when naphthalene is to be oxidized using a catalyst chiefly composed of the hitherto-known $V_2O_5$ or in the oxidation reaction of benzene using a mixture of vanadium pentoxide and molybdenum oxide.

In the following Table I are shown comparative results as to the yield and coloration of the phthalic anhydride and the life of the catalyst when a composition (catalyst) containing as its principal component $KHV_2O_6$ as used in the invention was caused to be adhered to various types of carriers, and these were then employed in the gaseous phase oxidation of orthoxylene. The experimental conditions and the catalyst preparation conditions which become the bases for the determination of the results shown in the following Table I where identical to that of Example 1A.

TABLE I

| Carrier | Phthalic anhydride yield (percent) | Catalyst life and coloration of phthalic anhydride |
| --- | --- | --- |
| Activated alumina | 42 | Product coloration great. |
| Fused alumina (Alundum) | 65 | Catalyst life about 2 months. |
| Anatase type $TiO_2$ | 75 | |
| Rutile type $TiO_2$ | 63 | |
| Pumice | 70 | Catalyst life short. |
| Aluminum sponge | 69 | Do. |
| Silica gel | 67 | |
| Gypsum | 75 | Do. |

In the above Table I, the yield of phthalic anhydride has been indicated as a percentage of that when the theoretical yield on the basis of the used orthoxylene was considered as 100%.

While it is evident from the results of Table I, above, that the anatase type titanium oxide is a very excellent carrier, the anatase type titanium oxide is characterized in that generally its surface area is very small as compared with the rutile type titanium oxide.

Figure 2:
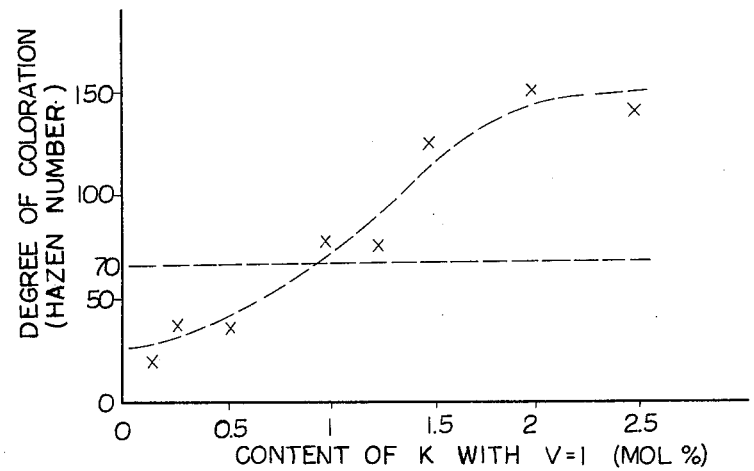

Next, FIGURES 1 and 2 of the accompanying drawings will be described. FIGURES 1 and 2 are graphs showing respectively the results as determined of the yield and degree of coloration of a phthalic anhydride obtained in accordance with the conditions of the hereinafter described Example 1A by oxidizing orthoxylene at 420° C. using as the carrier the same anatase type titanium oxide, employing however as catalysts those which had been prepared so that their V:K molar ratio would be changed variously by varying the amounts of the ammonium metavanadate and potassium sulfate used.

In this experiment for obtaining the results as shown FIGURE 1, in order to maintain the catalyst composition in an active state a $SO_2$ gas was passed through the catalytic system for 20 minutes every 10 days. The life of each of the catalyst compositions used was determined by taking as the measure the period that elapsed from the point at which the respective catalysts exhibited their maximum yields to the point at which the yields of these catalysts fell 20% below their maximum. FIGURE 1 is that which concerns a study of the state of change in the life of a catalyst concomitant with the change in the K content, which has been shown by plotting the value representing the content of K when V=1 on a molar basis on the axis of abscissas, and the period until a 20% fall in the yield, on the axis of ordinates. As is apparent from FIG. 1, when a catalyst is used which has been prepared by mixing ammonium metavanadate and potassium sulfate such that the molar ratio of V:K becomes approximately 1:0.25–0.75, the life of the catalyst is very long. On the other hand, when the molar ratio of V:K becomes that in which the proportion of potassium is 1:0.25 or less or 1:0.75 or more, the life of the catalyst becomes shorter, more so and abruptly, the more the proportion of potassium sulfate deviates from the above range.

FIGURE 2 is that which shows the changes in the degree of coloration of a reactant product containing phthalic anhydride concomitant with the change in the proportion of V to K. The degree of coloration has been shown by its Hazen number which represents the coloration at 140° C. of a liquid obtained by distilling the reactant product under a reduced pressure of 200 mm. Hg. This Hazen number value was plotted on the axis of ordinates while the molar ratio of K when V=1 was plotted on the axis of abscissas. In general, when the Hazen number exceeds 70, the product obtainable becomes of no practical use. Hence, from the standpoint of the coloration of the reactant product, it can be understood that the V:K must be a ratio of 1 to less than 1, the V:K particularly in the range of 1:0.25–0.75 being most suitable from a practical standpoint.

We also found as a result of our researches that when the $KHV_2O_6$ used in the present invention or the catalyst containing the same as its principal component was contacted under heat with sulfur or sulfur-containing compounds, it was possible to reactivate the catalyst over and over again. Other than the $SO_2$ gas as mentioned in the description concerning FIGURE 1, any of the sulfur-containing compounds which are normally gaseous or which are capable of becoming gaseous by decomposition such as sulfuric acid, $SO_3$ gas, carbon bisulfide, thiophene, etc. may be used. Or, the activity of the catalyst can be also maintained by causing sulfur or a sulfur-containing compound to be mixed together with the orthoxylene or naphthalene.

In case the catalytic activity of the catalyst of the present invention declines during its use in the oxidation reaction of orthoxylene or naphthalene, the passage through the catalytic layer of a gas such as air, carbon dioxide gas, nitrogen, etc., which contain sulfur compounds, as mentioned above, for a short period of about 5–10 minutes while heating to about 200–500° C., during the reaction, or by interrupting the reaction, reactivates the catalyst of the present invention containing $KHV_2O_6$ as to make possible its use for a long period of time as an oxidation reaction catalyst of orthoxylene or naphthalene.

In accordance with the invention, when as the starting material orthoxylene or a mixture of orthoxylene and naphthalene whose content of the latter is less than 50% by weight is used, it is possible to prepare phthalic anhydride of especially high purity at particularly high yields.

Therefore, the present invention has a very strong point particularly in that it has made possible the preparation advantageously on a commercial scale of phthalic anhydride from orthoxylene or a mixture of orthoxylene and naphthalene, which was hitherto considered to be practically impossible.

In order to more clearly understand the present invention, the following examples are given, it being understood that the same are merely intended in an illustrative sense, and the invention should not be limited thereby. In the following examples, A are examples in accordance with the method of the present invention while B are examples, given by way of reference, to be compared with the applicants' novel process.

*Example 1*

(A) A yellow hot liquor obtained by dissolving 43.2 grams of potassium sulfate in 600 cc. of water, to which was then added 55.7 grams of ammonium metavanadate (43.2 grams in terms of $V_2O_5$), was caused to be soaked into 550 grams of an anatase type titanium oxide (titanium white). Then this was dried, ground and molded into tablets 5 mm. in diameter and 5 mm. in height using a tablet molding machine. These tablets were burned for 5 hours in a hot air of 420–450° C., and tablets of light yellow color and apparent specific gravity of 1.35 were obtained. The light yellow tablets were then packed into a reaction tube and air, containing $SO_3$, was passed through said tube. A tablet-type catalyst, yellow-green in color, was obtained. Using this catalyst at 420° C., 9 grams of phthalic anhydride were obtained from 10 grams of orthoxylene.

(B) When the tablet obtained by burning at 420–450° C. for 5 hours was used as a catalyst without further treatment, and 10 grams of orthoxylene were oxidized, 4.5 grams of phthalic anhydride were obtained.

Example 2

By placing 28 grams of vanadium pentoxide in 40 cc. of water and adding further 40 grams of a 50% sulfuric acid a slurry was prepared. An $SO_2$ gas was blown into this, and the vanadium pentoxide was completely dissolved becoming a blue, transparent liquid. 100 cc. of water was then added to this liquid, and 14 grams of potassium sulfate were further added, which latter was dissolved by heating. 180 grams of silica gel were added to this and the mixture blended well to make a uniform paste. After drying and grinding, the mixture was molded into tablets 5 mm. in diameter with a tablet molding machine. When burned for 3 hours at 420° C., tablets of golden color having an apparent specific gravity of 0.72 were obtained. When this was used as a catalyst and 10 grams of orthoxylene were oxidized at a reaction temperature of 380° C., 9.4 grams of phthalic anhydride were obtained.

10 grams of naphthalene were oxidized under identical conditions, and 10.5 grams of phthalic anhydride were obtained.

Example 3

7 grams of potassium sulfate were dissolved in a sulfuric acid solution of vanadyl sulfate ($V_2O_4 \cdot SO_4$) containing in terms of vanadium pentoxide 7 grams thereof. To this liquid 200 grams of Alundum formed into spheres 5 mm. in diameter were immersed, and after drying, the Alundum was further coated with all of the remaining liquid and dried again. This was then burned for 3 hours at 450° C. When this catalyst was used and 10 grams of orthoxylene were oxidized, 9.19 grams of phthalic anhydride were obtained.

Example 4

10 grams of potassium sulfate were dissolved in a 20% sulfuric acid solution containing vanadyl sulfate in a concentration of 10% by weight, which contained in terms of vanadium pentoxide 20 grams thereof. Then 140 grams of an anatase type titanium white were added to this, and after thorough blending, the mixture was dried and molded. When this was burned for 5 hours at 400–430° C., tablets were obtained having an apparent specific gravity of 1.30 which were of yellow color tinged with green. Using this catalyst, it was possible to obtain 10.5 grams of phthalic anhydride from 10 grams of orthoxylene, 9.4 grams of phthalic anhydride from 10 grams of naphthalene and 10.3 grams of phthalic anhydride from a mixture of 7 grams of orthoxylene and 3 grams of naphthalene.

Example 5

10 grams of potassium sulfate were added to a sulfuric acid solution of vanadyl sulfate containing in terms of vanadium pentoxide 20 grams thereof. 150 grams of small-particled pumice 3–5 mm. in diameter were impregnated with this solution. When this was dried at 100° C. followed by burning for 5 hours at 420° C., it became a light yellow color and its apparent specific gravity was 0.78. Using this catalyst, 10 grams of orthoxylene were oxidized at a reaction temperature of 425° C., and 9.8 grams of phthalic anhydride were obtained. Also, 8.8 grams of phthalic anhydride were obtained from 10 grams of naphthalene.

Example 6

(A) To a hot liquid consisting of 10 grams of potassium oxalate dissolved in a vanadyl oxalate solution containing in terms of vanadium pentoxide 20 grams thereof 2 grams of a 50% sulfuric acid were added. This liquid was then coated on granular aluminum sponges of 3–5 mm. grain size followed by drying. When this was then burned for 5 hours at 400° C., it became yellow in color. Using this as the catalyst, 10 grams of orthoxylene were oxidized at a reaction temperature of 425° C. whereby 9.8 grams of phthalic anhydride were obtained. Similarly, by using this catalyst 9.2 grams of phthalic anhydride were obtained from 10 grams of naphthalene.

(B) The vanadium pentoxide catalyst having as a carrier silica gel and containing potassium sulfate is referred to as the so-called German catalyst. By using this catalyst 10.5 grams of phthalic anhydride could be obtained by oxidizing at 330° C. 10 grams of naphthalene. On the other hand, from 10 parts of orthoxylene it was only possible to obtain 6.4 parts of phthalic anhydride.

Having thus set forth the nature of the invention, what we claim is:

1. A catalyst for use in preparing phthalic anhydride by oxidizing a compound selected from the group consisting of orthoxylene, naphthalene and a mixture thereof, said catalyst comprising a catalytic component adhered to an anatase-type titanium oxide carrier and containing vanadium and potassium in a molar ratio of 1:0.25–0.75, said catalyst being prepared by mixing in a liquid medium a vanadium compound selected from the group consisting of vanadium pentoxide an ammonium metavanadate and a potassium compound selected from the group consisting of potassium sulfate, potassium chloride, potassium carbonate, potassium nitrate, potassium acetate and potassium formate, whereby the molar ratio of vanadium to potassium becomes 1:0.25–0.75, adhering this mixture to an anatase-type titanium oxide carrier and drying the same at a temperature above 40° C., thereafter heating the same to a temperature ranging between 200° and 500° C. under sulfuric acid acidic conditions.

2. A catalyst for use in preparing phthalic anhydride by oxidizing a compound selected from the group consisting of orthoxylene, naphthalene and a mixture thereof, said catalyst comprising a catalytic component adhered to an anatase-type titanium oxide carrier and containing vanadium and potassium in a molar ratio of 1:0.25–0.75, said catalyst being prepared by mixing in a liquid medium, under sulfuric acid acidic conditions, a vanadium compound selected from the group consisting of vanadium pentoxide and ammonium metavanadate and a potassium compound selected from the group consisting of potassium sulfate, potassium chloride, potassium carbonate, potassium nitrate, potassium acetate and potassium formate, whereby the molar ratio of vanadium to potassium becomes 1:0.25–0.75, reducing the mixture by adding a reducing acid in excess, followed by adhering the mixture to an anatase-type titanium oxide carrier, drying the mixture-adhered carrier at a temperature above 40° C., thereafter heating the same at a temperature ranging between 200° and 500° C.

3. A catalyst for use in preparing phthalic anhydride by oxidizing a compound selected from the group consisting of orthoxylene, naphthalene and a mixture thereof, said catalyst comprising a catalytic component adhered to an anatase-type titanium oxide carrier and containing vanadium and potassium in a molar ratio of 1:0.25–0.75, said catalyst being prepared by mixing a vanadyl compound selected from the group consisting of vanadyl sulfate and vanadyl oxalate and a potassium compound selected from the group consisting of potassium sulfate, potassium chloride, potassium carbonate, potassium nitrate, potassium acetate and potassium oxalate, whereby the molar ratio of vanadium to potassium becomes 1:0.25–0.75, adhering this mixture to an anatase-type titanium oxide carrier, drying the mixture-adhered carrier at a temperature above 40° C., and thereafter heating the same at a temperature ranging between 200° and 500° C.

4. A method of preparing a catalyst for use in producing phthalic anhydride by oxidizing a compound selected from the group consisting of orthoxylene, naphthalene and a mixture thereof, which method comprises mixing in a liquid medium a vanadium compound selected from the group consisting of vanadium pentoxide and ammonium metavanadate and potassium compound selected from the group consisting of potassium sulfate, potassium chloride, potassium carbonate, potassium nitrate, potassium acetate and potassium formate, whereby the molar ratio of vanadium to potassium becomes 1:0.25–0.75, adhering this mixture to an anatase-type titanium oxide carrier, drying the mixture-adhered anatase-type titanium oxide carrier at a temperature above 40° C., thereafter heating the same at a temperature ranging between 200° and 500° C. under sulfuric acid acidic conditions.

5. A method of preparing a catalyst for use in producing phthalic anhydride by oxidizing a compound selected from the group consisting of orthoxylene, naphthalene and a mixture thereof, which method comprises mixing in a liquid medium under sulfuric acid acidic conditions a vanadium compound selected from the group consisting of vanadium pentoxide and ammonium metavanadate and a potassium compound selected from the group consisting of potassium sulfate, potassium chloride, potassium carbonate, potassium nitrate, potassium acetate and potassium formate, whereby the molar ratio of vanadium to potassium becomes 1:0.25–0.75, reducing the mixture by adding a reducing acid in excess, adhering the mixture to an anatase-type titanium oxide carrier, drying the mixture-adhered anatase-type titanium oxide carrier at a temperature above 40° C., thereafter heating the same at a temperature ranging between 200° and 500° C.

6. A method of preparing a catalyst for use in producing phthalic anhydride by oxidizing a compound selected from the group consisting of orthoxylene, naphthalene and a mixture thereof, which method comprises mixing a vanadyl compound selected from the group consisting of vanadyl sulfate and vanadyl oxylate and a potassium compound selected from the group consisting of potassium sulfate, potassium chloride, potassium carbonate, potassium nitrate, potassium acetate and potassium oxalate, whereby the molar ratio of vanadium to potassium becomes 1:0.25–0.75, adhering this mixture to an anatase-type titanium oxide carrier, drying the mixture-adhered anatase-type titanium oxide carrier at a temperature above 40° C., thereafter heating the same at a temperature ranging from between 200° and 500° C.

References Cited by the Examiner

UNITED STATES PATENTS

| | | | |
|---|---|---|---|
| Re. 19,282 | 8/34 | Slama et al. | 252—456 X |
| 1,909,354 | 5/33 | Jaeger | 260—345.4 |
| 2,029,376 | 2/36 | Joseph | 252—440 X |
| 2,046,166 | 6/36 | Jenks | 252—440 |
| 2,079,507 | 5/37 | Johnson | 252—440 |
| 2,081,272 | 5/37 | Foster | 252—440 X |
| 2,157,965 | 5/39 | Pongratz | 260—346.4 |
| 2,574,511 | 11/51 | Toland | 260—346.4 |
| 2,574,512 | 11/51 | Toland | 260—346.4 |
| 2,674,582 | 4/54 | Darby | 252—456 |
| 2,769,018 | 10/56 | West | 260—346.4 |
| 2,809,939 | 10/57 | Dixon et al. | 252—456 |
| 2,815,352 | 12/57 | Johannsen et al. | 260—346.4 |
| 2,824,881 | 2/58 | Wettstein | 260—346.7 |
| 2,845,428 | 7/58 | Wettstein | 252—456 X |
| 2,942,005 | 6/60 | Brown et al. | 260—346.4 |
| 2,973,371 | 2/61 | Chomitz et al. | 252—456 X |
| 3,012,043 | 12/61 | Dowden et al. | 252—456 X |
| 3,086,026 | 3/63 | Wiebusch | 260—346.8 |

OTHER REFERENCES

Berkman, Catalysis (1940) Reinhold Publishing Corporation, New York, p. 439 QD501, B445.

MAURICE A. BRINDISI, *Primary Examiner.*

IRVING MARCUS, *Examiner.*